(12) United States Patent
Lee

(10) Patent No.: US 7,854,439 B2
(45) Date of Patent: Dec. 21, 2010

(54) SUSPENSION SYSTEM OF COUPLED TORSION BEAM AXLE

(75) Inventor: Hoo Gwang Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/498,791

(22) Filed: Jul. 7, 2009

(65) Prior Publication Data

US 2010/0133774 A1    Jun. 3, 2010

(30) Foreign Application Priority Data

Nov. 28, 2008    (KR)  ............ 10-2008-0120112

(51) Int. Cl.
*B60G 3/12*    (2006.01)
(52) U.S. Cl. .................. 280/124.128; 280/124.13; 280/124.116
(58) Field of Classification Search ......... 280/124.116, 280/124.106, 124.107, 124.128, 124.13, 280/124.132; 301/125, 132; 29/897.2
See application file for complete search history.

(56) References Cited

U.S. PATENT DOCUMENTS

| | | | |
|---|---|---|---|
| 5,326,128 A * | 7/1994 | Cromley, Jr. | ............ 280/656 |
| 6,447,073 B1 * | 9/2002 | Goettker | ............ 301/127 |
| 7,331,588 B2 * | 2/2008 | Johnson | ............ 280/86.754 |
| 7,722,064 B2 * | 5/2010 | Stuart et al. | ........ 280/124.128 |
| 2007/0246904 A1 * | 10/2007 | Murata et al. | ...... 280/124.128 |
| 2010/0019466 A1 * | 1/2010 | Lee | ............ 280/124.116 |

FOREIGN PATENT DOCUMENTS

| | | |
|---|---|---|
| JP | 60-67203 | 4/1985 |
| JP | 7-276949 A | 10/1995 |

* cited by examiner

*Primary Examiner*—Faye M. Fleming
(74) *Attorney, Agent, or Firm*—Morgan, Lewis & Bockius LLP

(57) ABSTRACT

A suspension system of a coupled torsion beam axle type may include a torsion beam that is disposed in the width direction of a vehicle body, left/right trailing arms that are mounted on respective ends of the torsion beam to be extended in the rearward direction of the vehicle body, and a spindle block that is mounted on one end of each of the respective trailing arms and in which a spindle is integrally formed in the front end surface thereof for a wheel to be mounted.

17 Claims, 4 Drawing Sheets

SUSPENSION SYSTEM OF COUPLED TORSION BEAM AXLE

CROSS-REFERENCE TO RELATED APPLICATION

The present application claims priority to Korean Patent Application No. 10-2008-0120112 filed on Nov. 28, 2008, the entire contents of which are incorporated herein for all purposes by this reference.

BACKGROUND OF THE INVENTION

1. Field of the Invention

The present invention relates to a suspension system of a vehicle. More particularly, the present invention relates to a suspension system of a coupled torsion beam axle type.

2. Description of Related Art

Generally, a suspension system of a vehicle connects an axle with a vehicle body, and prevents vibration or impact that is transferred from the road from being transferred to the vehicle body while driving to enhance ride comfort.

Suspension systems are classified into a front suspension system and a rear suspension system, and of these, there is a suspension system of a coupled torsion beam axle type (CTBA) in the rear suspension system.

The suspension system of a coupled torsion beam axle (CTBA) type has a simple structure to achieve low manufacturing cost and low weight while providing reliable driving stability, such that it is mainly used for a small car or a small sedan.

The suspension system of a coupled torsion beam axle type according to the conventional art includes a torsion beam that is disposed in the width direction of the vehicle body, and left/right trailing arms that are disposed at both ends of the torsion beam in the rearward direction of the vehicle body.

A bushing is mounted on one end portion of the trailing arm to be connected to the vehicle body, and a spindle plate is mounted on the other end portion thereof to be connected to a suspension spring.

Here, the spindle plate is welded to the end portion of the trailing arm in the conventional art.

However, torsion around the welding portion of the trailing arm and the spindle plate generates a transformation such that localized stress is concentrated on the transformed portion.

Accordingly, a crack may be formed around the welding portion in the conventional art such that durability of the entire device is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a suspension system of a coupled torsion beam axle type having advantages of not welding a spindle plate to fix a spindle with a trailing arm.

In an aspect of the present invention, the suspension system of a coupled torsion beam axle type, may include a torsion beam that is disposed in a width direction of a vehicle body, trailing arms that are mounted on respective distal ends of the torsion beam to be extended in a longitudinal direction of the vehicle body, and a spindle block that is mounted on one end portion of each of the trailing arms and in which a spindle is integrally formed in a front end surface thereof for a wheel to be mounted, wherein the spindle block includes a body portion that is inserted into the end portion of the trailing arm such that the spindle protrudes from the front end surface thereof, and that is engaged with the trailing arm by a plurality of engagement bolts.

A plurality of bolt holes may be formed around the end portion of the trailing arm such that the engagement bolts penetrate therethrough to be fixed to the body portion, wherein the body portion of the spindle block is shaped of a block and first, second, and third engagement threads are respectively formed in upper, lower, and rear surfaces of the body portion for the engagement bolts to be inserted thereto.

First, second, and third bolt holes through which the engagement bolts penetrate may be formed around the end portion of the trailing arm corresponding to the first, second, and third engagement threads, wherein the first bolt hole is formed in an upper surface of the trailing arm, the second bolt hole is formed in a lower surface of the trailing arm, and the third bolt hole is formed in a recess portion that is formed in the trailing arm and wherein the third bolt hole is formed corresponding to a protruding portion that is formed at a rear surface of the spindle block.

In another aspect of the present invention, a first member and a second member may be welded to each other to form the trailing arm, wherein edges of the first and second members are overlapped each other and at least one of the engagement bolts are configured to connect the overlapped edges of the first and second members to the spindle block.

The body portion of the spindle block may be shaped of a block and first, second, and third engagement threads are respectively formed in upper, lower, and rear surfaces of the body portion for the engagement bolts to be inserted thereto, wherein first and second bolt holes are formed at upper and lower overlapped portions of the first and second members, corresponding to the first and second engagement holes respectively, and a third bolt hole is formed in a recess portion of the first member, corresponding to the third engagement thread, wherein the third engagement hole is formed corresponding to a protruding portion that is formed at the rear surface of the spindle block, and wherein the spindle and the protruding portion are coaxially aligned.

In further another aspect of the present invention, the suspension system of a coupled torsion beam axle type, may include a torsion beam, a trailing arm that is disposed at both distal ends of the torsion beam in a longitudinal direction of a vehicle, a spindle block of which a rear end thereof is inserted into the trailing arm and of which a spindle is formed at a front end thereof, and at least an engagement bolt that penetrate one side surface of the trailing arm to be engaged with the spindle block so as to fix the trailing arm with the spindle block, wherein the trailing arm includes first and second members and edges of the first and second members are overlapped each other, wherein an engagement bolt is configured to connect the overlapped edges of the first and second members to the spindle block, wherein a first engagement bolt penetrates an upper surface of the trailing arm to be engaged with the spindle block.

A third engagement bolt penetrates a wall of a recess portion that may be formed in the trailing arm to be engaged with the rear end of the spindle block, wherein a protruding portion is formed on the rear end of the spindle block, and a bolt thread is formed in the protruding portion corresponding to a bolt hole that is formed in the recess portion.

Unlike the conventional art in which the spindle plate to which a spindle is fixed is welded to the trailing arm, in the suspension system of a coupled torsion beam axle type according to an exemplary embodiment of the present invention, the spindle block to which a spindle is integrally formed is engaged with the trailing arm such that the spindle plate is not used.

Also, unlike the conventional art, in the present exemplary embodiment, a heat transformation portion that is caused by welding of the spindle plate and a localized stress concentration of the welding portion can be prevented such that the durability of the entire suspension system is improved.

Further, differing from the conventional art, the spindle plate is not used such that the number of components, the weight, and the production cost can be reduced in the present exemplary embodiment.

In addition thereto, although welding torsion such as heat expansion or heat shrinking is formed in the welding portion, while the torsion beam and the trailing arm are welded together in the present exemplary embodiment, the first, second, and third engagement threads of the spindle block are fabricated corresponding to the correct coordinates of the vehicle such that the wheels of the vehicle are aligned with ease, when the spindle block is engaged with the trailing arm by the engagement bolts.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
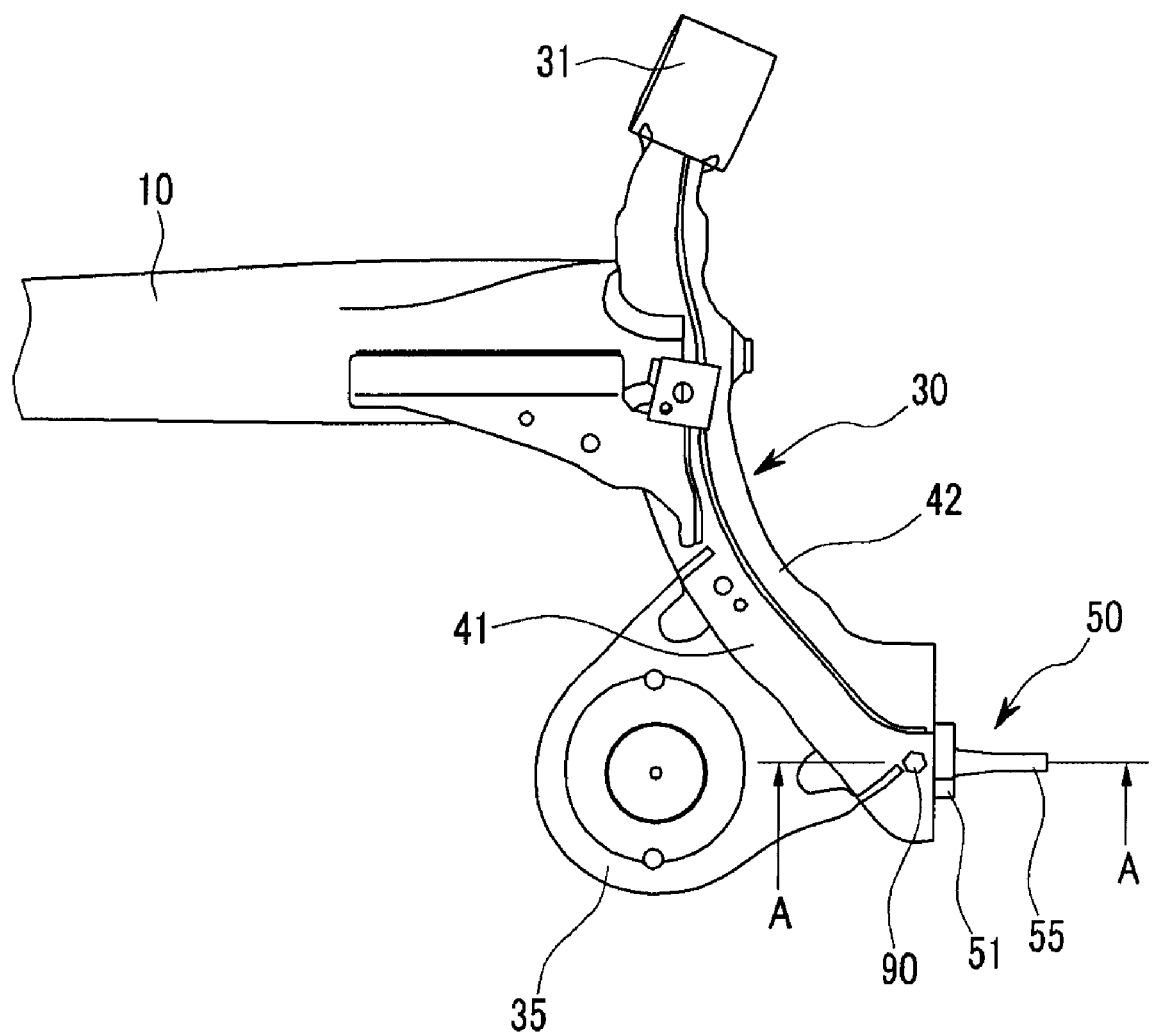
FIG. 1 is a partial perspective view showing an exemplary suspension system of a coupled torsion beam axle type according to the present invention.
Figure 2:
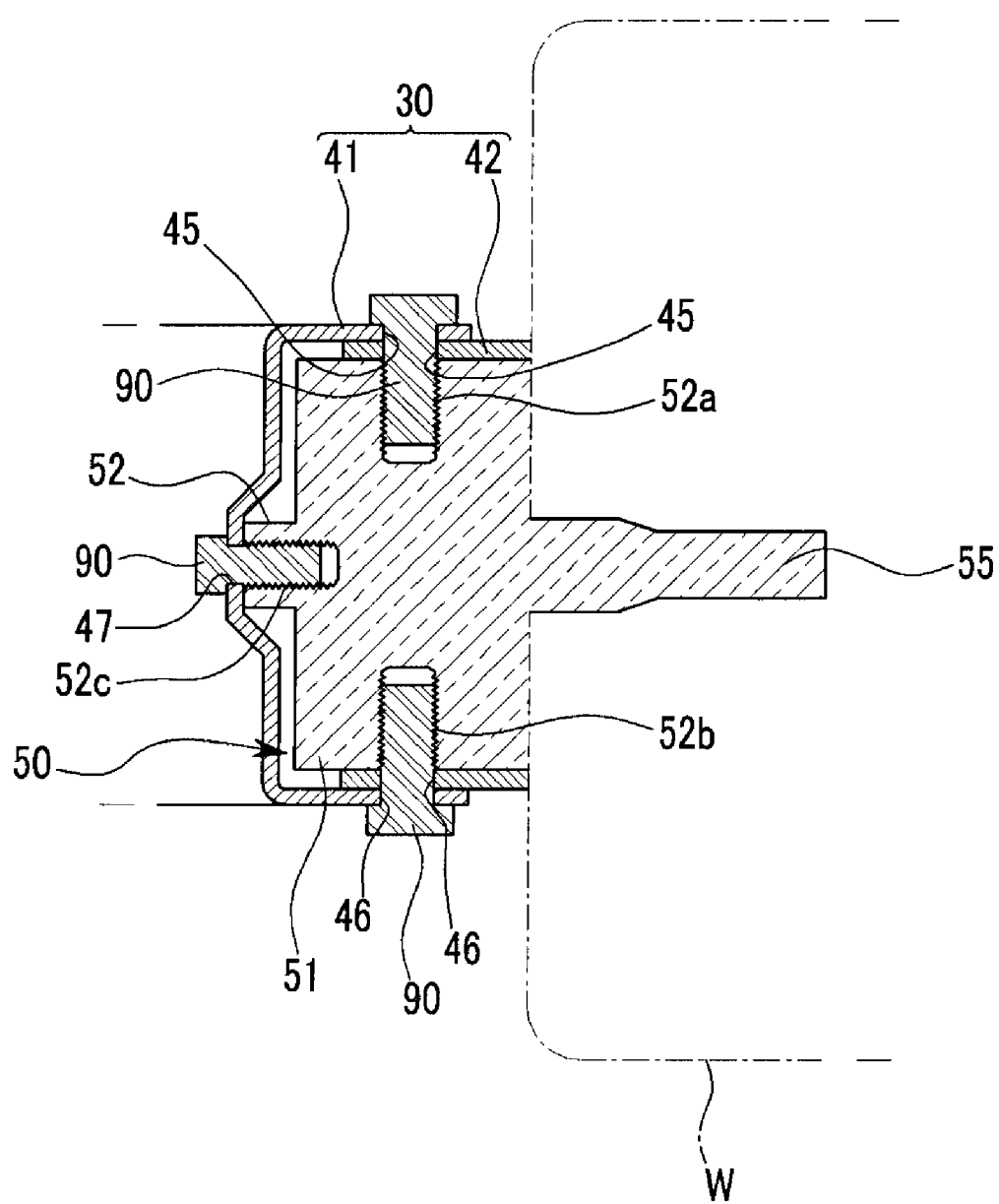
FIG. 2 is a schematic diagram according to the "A-A" line of FIG. 1.

FIG. 1 is a partial perspective view showing a suspension system of a coupled torsion beam axle type according to various embodiments of the present invention, and FIG. 2 is a schematic diagram according to the "A-A" line of FIG. 1.

Referring to the figures, a suspension system 100 of a coupled torsion beam axle type according to various embodiments of the present invention includes a rear suspension system of a vehicle.

The suspension system 100 of a coupled torsion beam axle type basically includes a torsion beam 10, left/right trailing arms 30, and a spindle block 50, and detailed descriptions thereof are as follows.

The torsion beam 10 has a cross-section of a "V" shape, and is disposed in the width direction of a vehicle body.

A trailing arm 30 is welded to each end of the torsion beam 10, and is disposed in the rearward direction of the vehicle body.

Here, a bushing case 31 is welded to one end portion of the trailing arm 30 to be connected to the vehicle body, and a spring bracket 35 is welded to the other end portion thereof for a suspension spring to be disposed.

The trailing arm 30 includes a first member 41 that is welded to each end portion of the torsion beam 10, and a second member 42 of which the edge thereof is inserted into the edge of the first member 41.

In this case, the first member 41 has a cross section of a "⊂" shape, and the second member 42 has a cross section of a "⊃" shape corresponding to that of the first member 41.

In various embodiments, the spindle block 50 is mounted on the other end portion of the trailing arm 30, and a spindle 55 is integrally formed therein for an axle (W) to be mounted.

The spindle block 50 is fixed to the trailing arm 30 by a plurality of engagement bolts 90.

It is desirable that the spindle block 50 includes a steel or aluminum material, and it can be fabricated through a forging or casting process.

Figure 3:
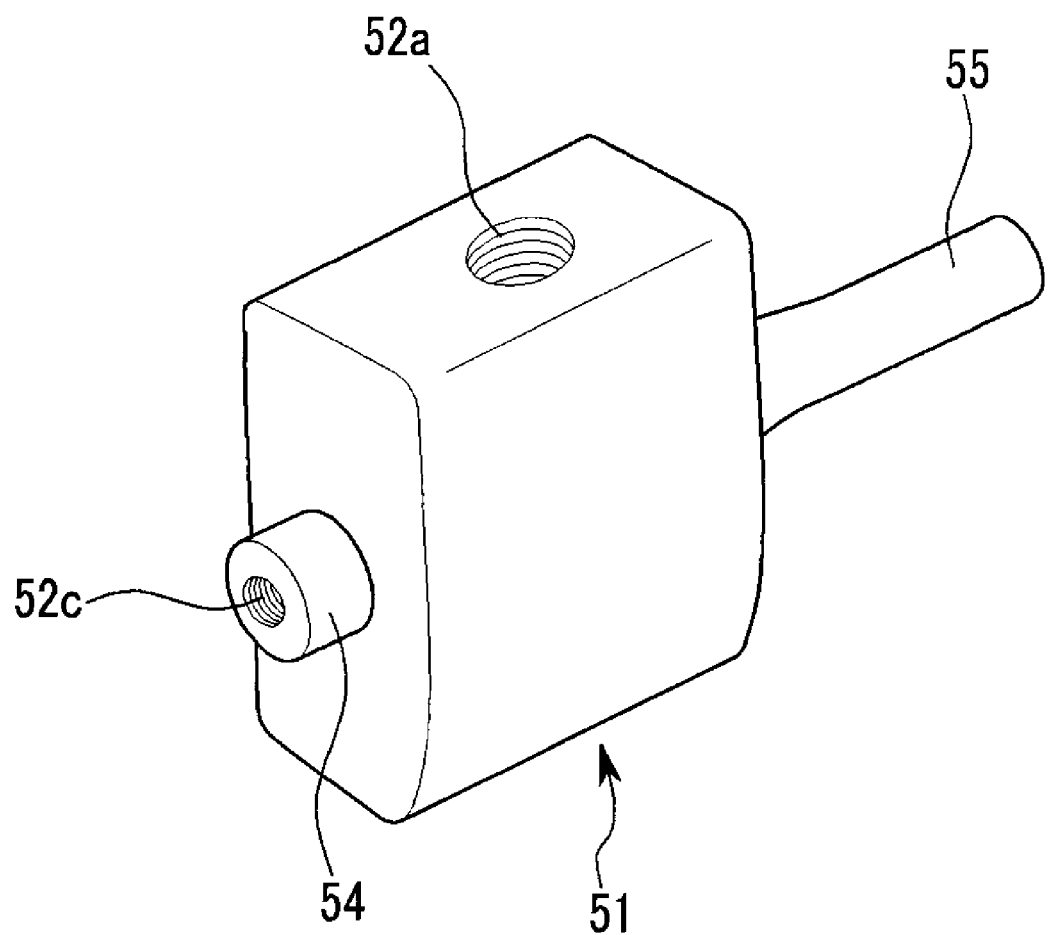
FIG. 3 is a perspective view showing an exemplary spindle block that is applied in a suspension system of a coupled torsion beam axle type according to the present invention.

The spindle block 50, as shown in FIG. 3, is inserted into the end portion of the trailing arm 30, and includes a body portion 51 from which the spindle 55 integrally protrudes as stated above.

The body portion 51 has a quadrangle block shape and is fixed to the end portion of the trailing arm 30 by the engagement bolts 90.

For this, first, second, and third engagement threads 52a, 52b, and 52c are formed on the upper surface, the lower surface, and the rear surface of the body portion 51, respectively, based on the vertical direction in the drawing for the engagement bolts 90 to be inserted.

Here, the third engagement threads 52c are formed in a protruding portion 54 that protrudes from the rear surface of the body portion 51.

Further, a wheel bearing is mounted on the spindle 55 for a wheel W to be disposed, and the spindle 55 protrudes from the front surface of the body portion 51 to be integrally formed with the body portion 51.

Meanwhile, first, second, and third bolt holes 45, 46, and 47 are formed in the end portion of the trailing arm 30 for the engagement bolts 90 to penetrate such that the body portion 51 of the spindle block 50 is fixed to one end portion of the trailing arm 30.

Figure 4:
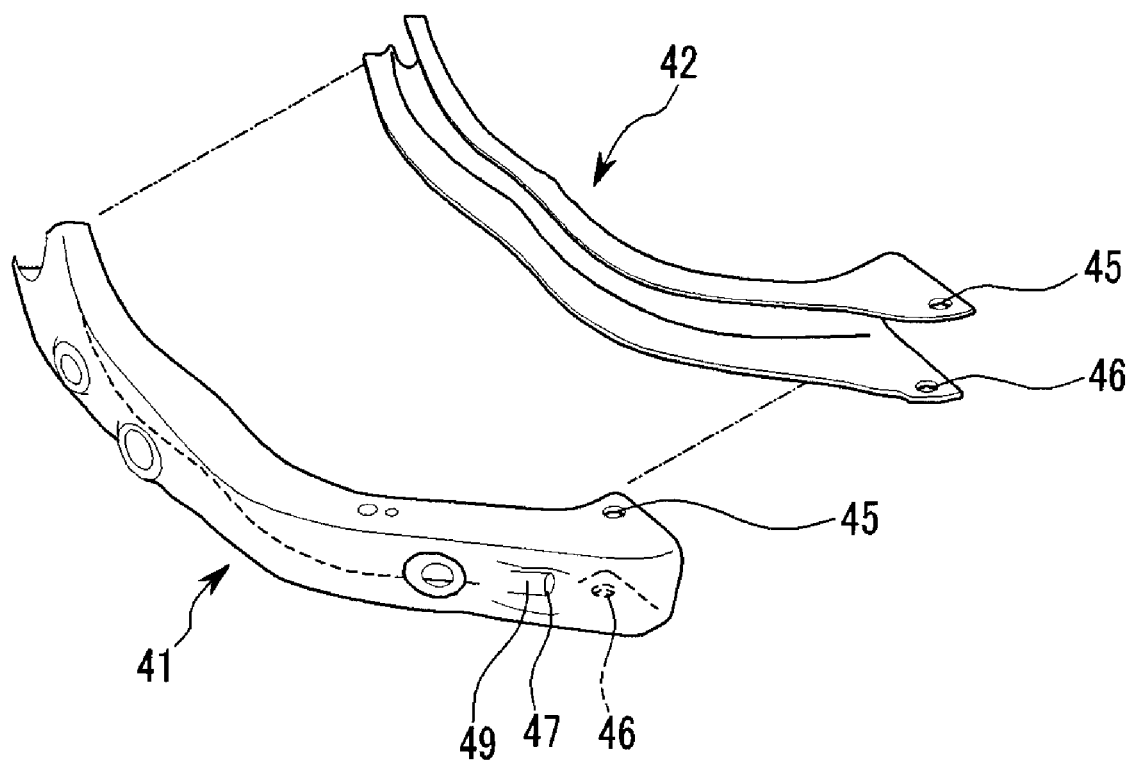
FIG. 4 is an exploded perspective view of an exemplary trailing arm that is applied in the suspension system of a coupled torsion beam axle type according to the present invention.

Specifically, as shown in FIG. 4, the first bolt hole 45 is formed in the upper side that the first and second members 41 and 42 overlap in the end portion of the trailing arm 30, and the second bolt hole 46 is formed in the lower side thereof.

Further, in the end portion of the first member 41 of the trailing arm 30, the third bolt hole 47 is formed inside a recess portion 49 that is concavely depressed corresponding to the protruding portion 54 of the body portion 51.

Accordingly, in the suspension system 100 of a coupled torsion beam axle type according to various embodiments of the present invention, the spindle block 50 in which the spindle 55 is integrally formed is fixed in the end portion of the trailing arm 30 by the engagement bolts 90.

That is, the body portion 51 of the spindle block 50 is inserted into the end portion of the trailing arm 30. In this case, the first, second, and third engagement threads 52a, 52b, and 52c of the body portion 51 respectively correspond to the first, second, and third bolt holes 45, 46, and 47 of the trailing arm 30.

In addition, the engagement bolts 90 are screwed to the first, second, and third engagement threads 52a, 52b, and 52c through the first, second, and third bolt holes 45, 46, and 47, which engage the spindle block 50 with the trailing arm 30.

As described above, the spindle 55 of the spindle block 50 protrudes to the outside of the end portion of the trailing arm 30.

In various embodiments of the present invention, the spindle 55 and the protruding portion 54 are aligned coaxially.

Herewith, the spindle block 50 to which the spindle 55 is integrally formed is fixed to the trailing arm 30 in various embodiments, differing from the conventional art in which a spindle plate to which a spindle is attached is welded to the trailing arm 30.

Also, unlike the conventional art, in various embodiments, a heat transformation portion that is caused by welding of the spindle plate and the localized stress concentration of the welding portion can be prevented such that the durability of the entire suspension system is improved.

In addition thereto, although the welding torsion such as heat expansion or heat shrinking is formed in the welding portion, while the torsion beam 10 and the trailing arm 30 are welded together in various embodiments, the first, second, and third engagement threads 52a, 52b, and 52c of the spindle block 50 are fabricated corresponding to the correct coordinates of the vehicle such that the wheels of the vehicle are aligned with ease, when the spindle block 50 is engaged with the trailing arm 30 by the engagement bolts 90.

For convenience in explanation and accurate definition in the appended claims, the terms "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension system of a coupled torsion beam axle type, comprising:
    a torsion beam that is disposed in a width direction of a vehicle body;
    trailing arms that are mounted on respective distal ends of the torsion beam to be extended in a longitudinal direction of the vehicle body; and
    a spindle block that is mounted on one end portion of each of the trailing arms and in which a spindle is integrally formed in a front end surface thereof for a wheel to be mounted,
    wherein the spindle block includes a body portion that is inserted into the end portion of the trailing arm such that the spindle protrudes from the front end surface thereof, and that is engaged with the trailing arm by a plurality of engagement bolts.

2. The suspension system of claim 1, wherein a plurality of bolt holes are formed around the end portion of the trailing arm such that the engagement bolts penetrate therethrough to be fixed to the body portion.

3. The suspension system of claim 2, wherein the body portion of the spindle block is shaped of a block and first, second, and third engagement threads are respectively formed in upper, lower, and rear surfaces of the body portion for the engagement bolts to be inserted thereto.

4. The suspension system of claim 3, wherein first, second, and third bolt holes through which the engagement bolts penetrate are formed around the end portion of the trailing arm corresponding to the first, second, and third engagement threads.

5. The suspension system of claim 4, wherein the first bolt hole is formed in an upper surface of the trailing arm, the second bolt hole is formed in a lower surface of the trailing arm, and the third bolt hole is formed in a recess portion that is formed in the trailing arm.

6. The suspension system of claim 5, wherein the third bolt hole is formed corresponding to a protruding portion that is formed at a rear surface of the spindle block.

7. The suspension system of claim 2, wherein a first member and a second member are welded to each other to form the trailing arm.

8. The suspension system of claim 7, wherein edges of the first and second members are overlapped each other and at least one of the engagement bolts are configured to connect the overlapped edges of the first and second members to the spindle block.

9. The suspension system of claim 8, wherein the body portion of the spindle block is shaped of a block and first, second, and third engagement threads are respectively formed in upper, lower, and rear surfaces of the body portion for the engagement bolts to be inserted thereto.

10. The suspension system of claim 9, wherein first and second bolt holes are formed at upper and lower overlapped portions of the first and second members, corresponding to the first and second engagement holes respectively, and a third bolt hole is formed in a recess portion of the first member, corresponding to the third engagement thread.

11. The suspension system of claim 10, wherein the third engagement hole is formed corresponding to a protruding portion that is formed at the rear surface of the spindle block.

12. The suspension system of claim 11, wherein the spindle and the protruding portion are coaxially aligned.

13. A suspension system of a coupled torsion beam axle type, comprising:
    a torsion beam;
    a trailing arm that is disposed at both distal ends of the torsion beam in a longitudinal direction of a vehicle, wherein the trailing arm includes first and second members and edges of the first and second members are overlapped each other;
    a spindle block of which a rear end thereof is inserted into the trailing arm and of which a spindle is formed at a front end thereof; and
    at least an engagement bolt that penetrate one side surface of the trailing arm to be engaged with the spindle block so as to fix the trailing arm with the spindle block.

14. The suspension system of claim 13, wherein an engagement bolt is configured to connect the overlapped edges of the first and second members to the spindle block.

15. The suspension system of claim 13, wherein a first engagement bolt penetrates an upper surface of the trailing arm to be engaged with the spindle block.

16. The suspension system of claim 13, wherein a third engagement bolt penetrates a wall of a recess portion that is formed in the trailing arm to be engaged with the rear end of the spindle block.

17. The suspension system of claim 16, wherein a protruding portion is formed on the rear end of the spindle block, and a bolt thread is formed in the protruding portion corresponding to a bolt hole that is formed in the recess portion.

* * * * *